US011474589B2

(12) United States Patent
Koki et al.

(10) Patent No.: US 11,474,589 B2
(45) Date of Patent: Oct. 18, 2022

(54) POWER SAVING FOR TYPE-C CONNECTORS

(71) Applicant: Intel Corporation, Santa Clara, CA (US)

(72) Inventors: Tarakesava Reddy Koki, Bangalore (IN); Phani K Alaparthi, Bangalore (IN); Ranganadh Kss, Bangalore (IN); Shobhit Chahar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/407,060

(22) Filed: Aug. 19, 2021

(65) Prior Publication Data

US 2021/0382541 A1    Dec. 9, 2021

Related U.S. Application Data

(63) Continuation of application No. 16/458,024, filed on Jun. 29, 2019, now Pat. No. 11,099,623.

(51) Int. Cl.
*G06F 1/3234* (2019.01)
*H02J 7/00* (2006.01)
*H02J 9/00* (2006.01)

(52) U.S. Cl.
CPC ............ *G06F 1/3253* (2013.01); *H02J 7/007* (2013.01); *H02J 9/005* (2013.01); *G06F 1/3243* (2013.01); *H02J 7/00* (2013.01)

(58) Field of Classification Search
None
See application file for complete search history.

(56) References Cited

U.S. PATENT DOCUMENTS 10,205,257 B1    2/2019    Li et al.
2015/0261714 A1*    9/2015    Talmola .............. G06F 13/4068
710/316

(Continued)

FOREIGN PATENT DOCUMENTS

WO    2018080109    5/2018

OTHER PUBLICATIONS

International Search Report & Written Opinion dated Sep. 1, 2020 for PCT Patent Application No. PCT/US2020/032971.

(Continued)

*Primary Examiner* — Henry Tsai
*Assistant Examiner* — Dean Phan
(74) *Attorney, Agent, or Firm* — Schwabe, Williamson & Wyatt, P.C.

(57) ABSTRACT

Described are mechanisms and methods to facilitate power saving in Type-C connectors. Some embodiments may comprise an interface to a Configuration Channel (CC) signal path and to a ground signal path of a Universal Serial Bus (USB) Type-C connector port, a first circuitry, and a second circuitry. The first circuitry may be operable to place toggled values on the CC signal path. The second circuitry may be operable to couple the ground signal path to a detection signal path. The placement of the toggled values on the CC signal path is enabled when the detection signal path carries a first value that corresponds with the USB Type-C connector port being connected to a USB Type-C device, and may be disabled when the detection signal path carries a second value that corresponds with the USB Type-C connector port not being connected to a USB Type-C device.

20 Claims, 12 Drawing Sheets

(56) References Cited

U.S. PATENT DOCUMENTS

| | | |
|---|---|---|
| 2016/0364360 A1 | 12/2016 | Lim |
| 2017/0005447 A1 | 1/2017 | Kim et al. |
| 2017/0220090 A1 | 8/2017 | Kim |
| 2018/0067885 A1* | 3/2018 | Hsieh .................. G06F 1/22 |
| 2020/0067304 A1* | 2/2020 | Kim .................. H02H 7/20 |

OTHER PUBLICATIONS

Non-Final Office Action dated Oct. 19, 2020 for U.S. Appl. No. 16/458,024, 7 pages.

\* cited by examiner

POWER SAVING FOR TYPE-C CONNECTORS

RELATED APPLICATIONS

This application is a continuation of U.S. patent application Ser. No. 16/458,024, entitled "POWER SAVING FOR TYPE-C CONNECTORS" filed on Jun. 29, 2019, and claims priority to the Ser. No. 16/458,024 application. The entire contents of the Ser. No. 16/458,024 application is incorporated herein by reference.

BACKGROUND

The Universal Serial Bus (USB) Type-C interface has grown in popularity. Various systems may have multiple Type-C ports to meet user demands.

Based on a detection mechanism defined by the Type-C specification, when no device is attached to a Type-C port, the Configuration Channel (CC) lines of the Type-C port may toggle, which may begin as soon as a corresponding Power Delivery (PD) controller powers on and may proceed until a device is attached, even in Standby and Connected Standby states. Due to this toggling, the PD controller may draw power that amounts to a significant portion of the allowed power dissipation budgets of various systems (even in Standby and Connected Standby states).

Meanwhile, Type-C ports in a system support a Dual Role Port (DRP) feature by which a Type-C ports may become Upstream Facing Ports (UFPs) that take power, or Downstream Facing Ports (DFPs) that provide power. However, since both ends of Type-C cables are the same, it is possible to connect two Type-C ports of the same system to each other through a Type-C cable. When two Type-C ports of same system are connected together with a cable, one Type-C port may attempt to charge the other Type-C port, and power may be wasted and lost in the associated conversions.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
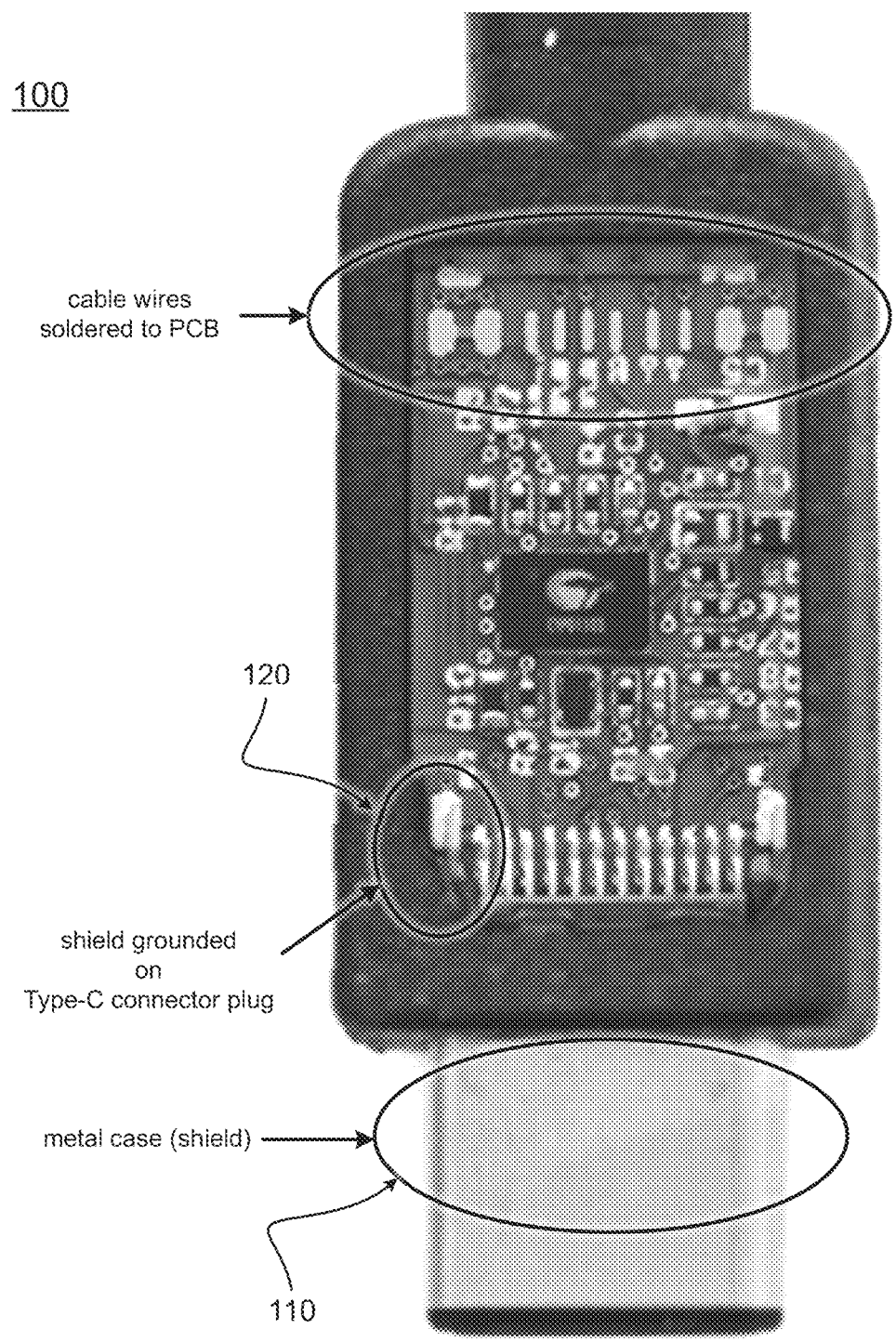
FIG. 1 illustrates a top view of a Type-C receptacle connector, in accordance with some embodiments of the disclosure.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

A first variety of embodiments may pertain to Power saving in Standby and Connected Standby modes by turning OFF PD (Power Delivery) controller Configuration Channel (CC) Logic. The USB Type-C specification defines a detection mechanism. When no device is attached to a Type-C port, CC lines of the Type-C port may toggle at about a 100 millisecond (ms) time period, with a duty cycle of 30% to 70%, and may wait for a complementary termination pull-up (RP) or pull-down (RD) upon a device being attached. (E.g., the port may toggle the CC lines between DFP (for exposing a pull-up on a CC line) and UFP (for exposing a pull-down on a CC line), to support a Dual Role Port (DRP) feature). CC line toggling may start as soon as a corresponding PD controller is powered and may proceed until a device is attached.

A PD controller may be disposed to being on (and thus, to toggling CC lines) even in Standby and Connected Standby states. Meanwhile, due to the toggling of the CC lines, the PD controller may draw an amount of power between 0.5 milliwatts (mW) and 2.0 mW, depending on the PD controller used in the system.

In complying with industry Connected Standby definitions, for many or most mobile devices, an allowed power dissipation budget may be 5.0 mW. For tablets & dual display devices, an allowed power dissipation budget may be 16 mW, and for personal computers (PCs) and laptops, an allowed power dissipation budget may be around 80 mW. Power dissipation may also depend upon the capacity of battery in the device.

In general, mobile and tablet devices may have one Type-C port with a PD controller. If the PD controller alone consumes from 0.5 mW to 2.0 mW, that may amount to about 10% to 40% of a system budget power from an allowed power dissipation budget of 5.0 mW for the Connected Standby mode. Meanwhile, since laptops may have three or more Type-C ports, power consumption of an associated PD controller may be from 1.5 mW to 6.0 mW.

Since Type-C PD controllers may consume more power in Connected Standby and Standby modes, there may be an advantage in reducing PD controller power when no device is attached.

For the first variety of embodiments, one of the four ground pins available in the Type-C connector may be used to identify if any device is being attached or detached to the Type-C port (e.g., the Type-C receptacle connector). This ground pin may be used an active-low connection-detection pin (DET #), and may be connected to a PD controller. When a Type-C connector plug is inserted into a Type-C connector receptacle, the DET # signal may be pulled low, and the PD Controller may thereby determine that a plug event has occurred and may subsequently toggles the CC lines.

Since the mechanisms disclosed herein may use one of the ground pins from the Type-C Connector for detection of device plug-in events, in order to compensate the return current carrying capacity among the ground pins, the shield pins may be used as ground. In general, the shield pins of Type-C connectors may be tied to ground.

Advantages of the methods and mechanisms disclosed herein may include: (1) reduction or elimination of power loss in a Connected Standby state, due to the PD controller not consuming additional power to drive CC lines; (2) these mechanisms may not call for a change of electro-mechanical specifications for Type-C connectors; and (3) since the mechanisms may merely need to connect a pull-up resistor on the PCB of the DET # pin (e.g., one of the ground pins of the Type-C connector), implementation may be straight-forward.

The proposed mechanisms and methods may to the CC logic in a sleep mode and may inhibit toggling of the CC lines until a Type-C plug is inserted. Once the PD controller detects that a Type-C connector plug has been inserted, CC lines may then be toggled by PD controller.

FIG. 1 illustrates a top view of a Type-C receptacle connector, in accordance with some embodiments of the disclosure. A Type-C connector plug 100 may comprise a metal case 110 and grounding 120. In various embodiments, metal case 110 (which may be a shield) may be grounded on plug 100.

Figure 2:
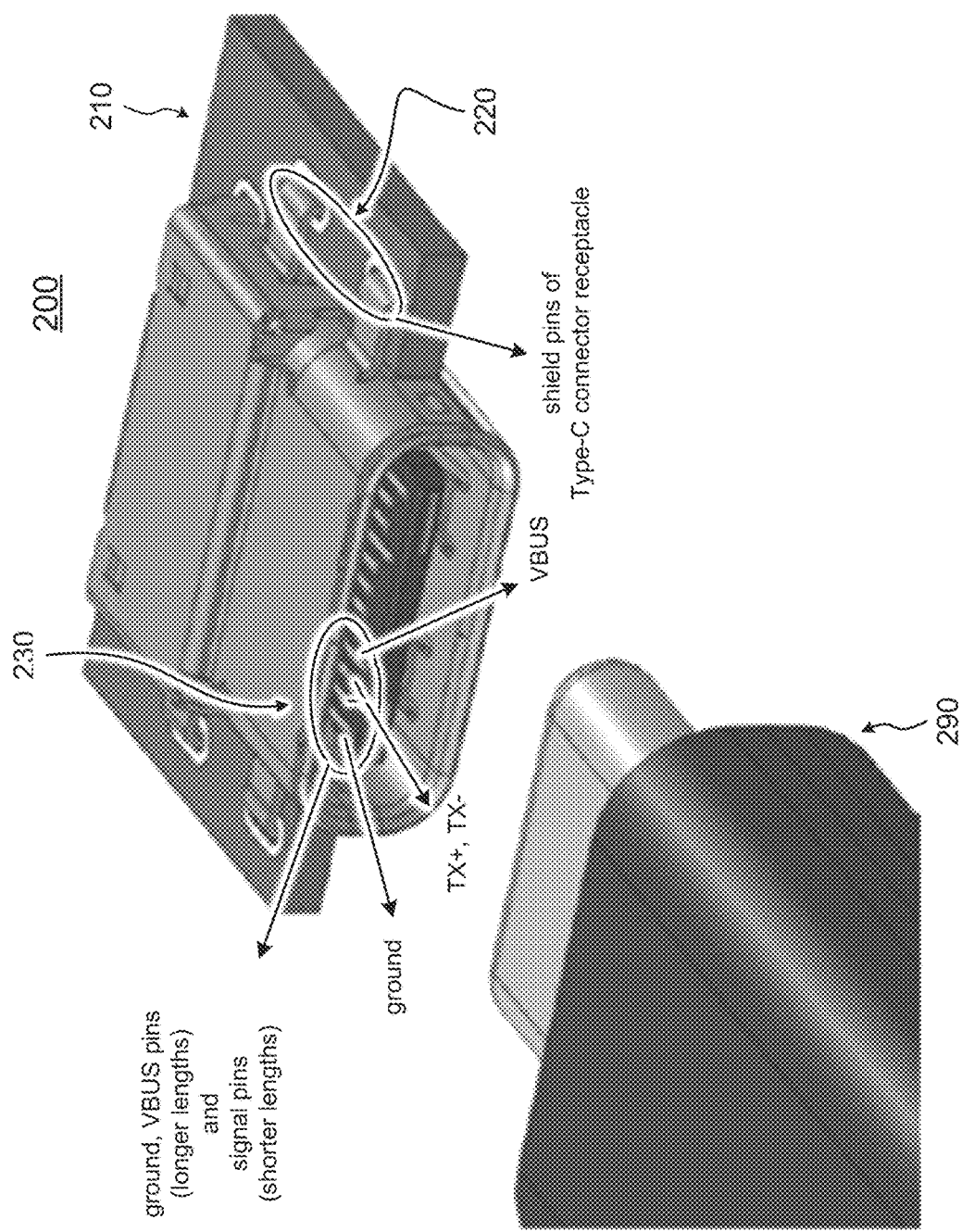
FIG. 2 illustrates a front perspective view of a Type-C receptacle connector, in accordance with some embodiments of the disclosure.

FIG. 2 illustrates a front perspective view of a Type-C receptacle connector, in accordance with some embodiments of the disclosure. A Type-C connector receptacle 200 may comprise a Printed Circuit Board (PCB) 210, a case 220, and various pins 230. Connector receptacle 200 is shown in the proximity of a Type-C connector plug 290 (which may be substantially similar to connector plug 100).

In various embodiments, a metal case of a Type-C connector plug (e.g., metal case 110) may be mated with a shield of a Type-C connector receptacle (e.g., case 220), which may be grounded on a PCB of the system (e.g., PCB 210) with connector shield pins. On the other side, a metal case on the Type-C connector plug (e.g., metal case 110) may be grounded on a PCB of the Type-C plug.

For the Type-C connector plug PCB, one side of the PCB may be connected to Type-C connector plug pins (including shield pins), and the other side of the PCB may be connected to wires of the Type-C connector cable. This may advantageously ensure that a ground return current carrying capability of the Type-C connector cable and the Type-C connector satisfy the specification.

In various embodiments, the Type-C receptacle connector may have power pins and ground pins that are of longer lengths compared to other signal pins (e.g., CC signal pins, USB pins, and so forth). Accordingly, the power pins and ground pins may mate first when a Type-C connector plug is inserted, and break last when the Type-C connector plug is removed. A typical differential in contact time between the power pins and the signals pins may be on the order of milliseconds. This time may be sufficient to wake a CC control logic and start to toggle the CC lines before the CC pins contact Type-C connector plug. Accordingly, the mechanisms disclosed herein may advantageously not add delay to Type-C CC detection mechanisms.

Figure 3:
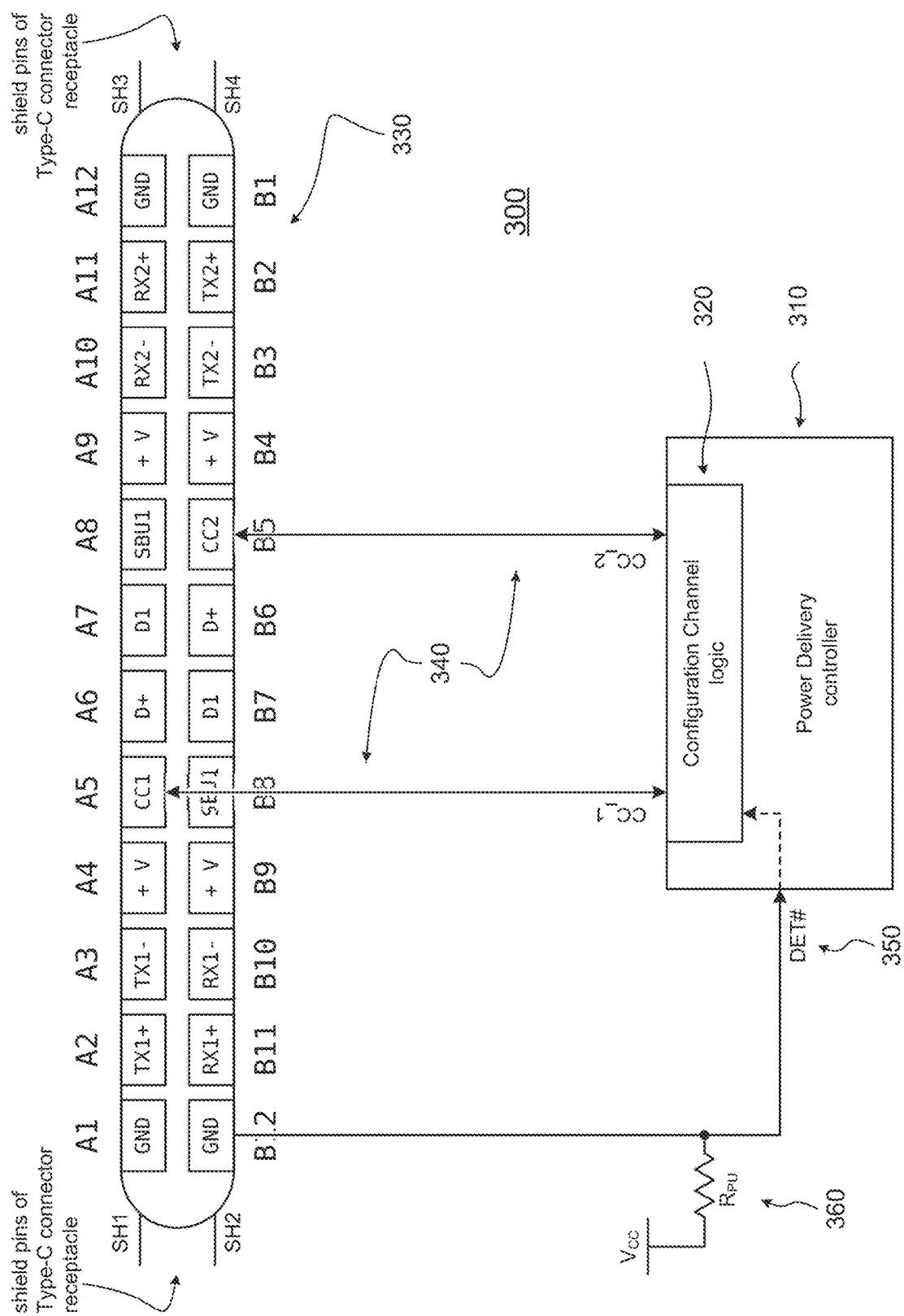
FIG. 3 illustrates a schematic view of a Type-C receptacle connector, in accordance with some embodiments of the disclosure.

FIG. 3 illustrates a schematic view of a Type-C receptacle connector, in accordance with some embodiments of the disclosure. A design 300 may comprise a PD controller 310, a CC logic 320, a receptacle pinout 330, CC lines 340, a DET # line 350, and a pull-up resistor $R_{PU}$ 360.

PD controller 310 may comprise CC logic 320. CC lines 340 (e.g., a CC_1 line and a CC_2 line) may extend between CC pins of receptacle pinout 330 on one end, and PD controller 310 and/or CC logic 320 on the other end. DET # line 350 may extend between one of four ground pins of receptacle pinout 330 on one end (e.g., pin B12, or A1, or A12, or B1), and PD controller 310 and/or CC logic 320 on the other end. $R_{PU}$ 360 may extend between DET # line 350 on one end and a supply voltage $V_{CC}$ on the other end.

Accordingly, in DET # 350 may by default be pulled up to $V_{CC}$. When a Type-C connector plug is inserted into the Type-C connector receptacle, the Type-C connector plug will pull DET # 350 to a low voltage value (e.g., because ground pins on the Type-C connector plug PCB may be grounded, and may make DET # 350 transition to the low voltage value as soon as the Type-C connector plug is inserted). As soon as DET # 350 goes low, PD controller 310 may toggling CC lines 340 for orientation and/or role identification.

Since the mechanisms disclosed herein may be using one of the ground pins (e.g., of receptacle pinout 330) for determining Type-C connector plug insertion into a Type-C connector receptacle, it may reduce a return current carrying capability of a Type-C connector. In various embodiments, this may be compensated by shield pins of the Type-C connector receptacle. In general, all shield pins of the Type-C connector receptacle may be tied to ground.

Figure 4:
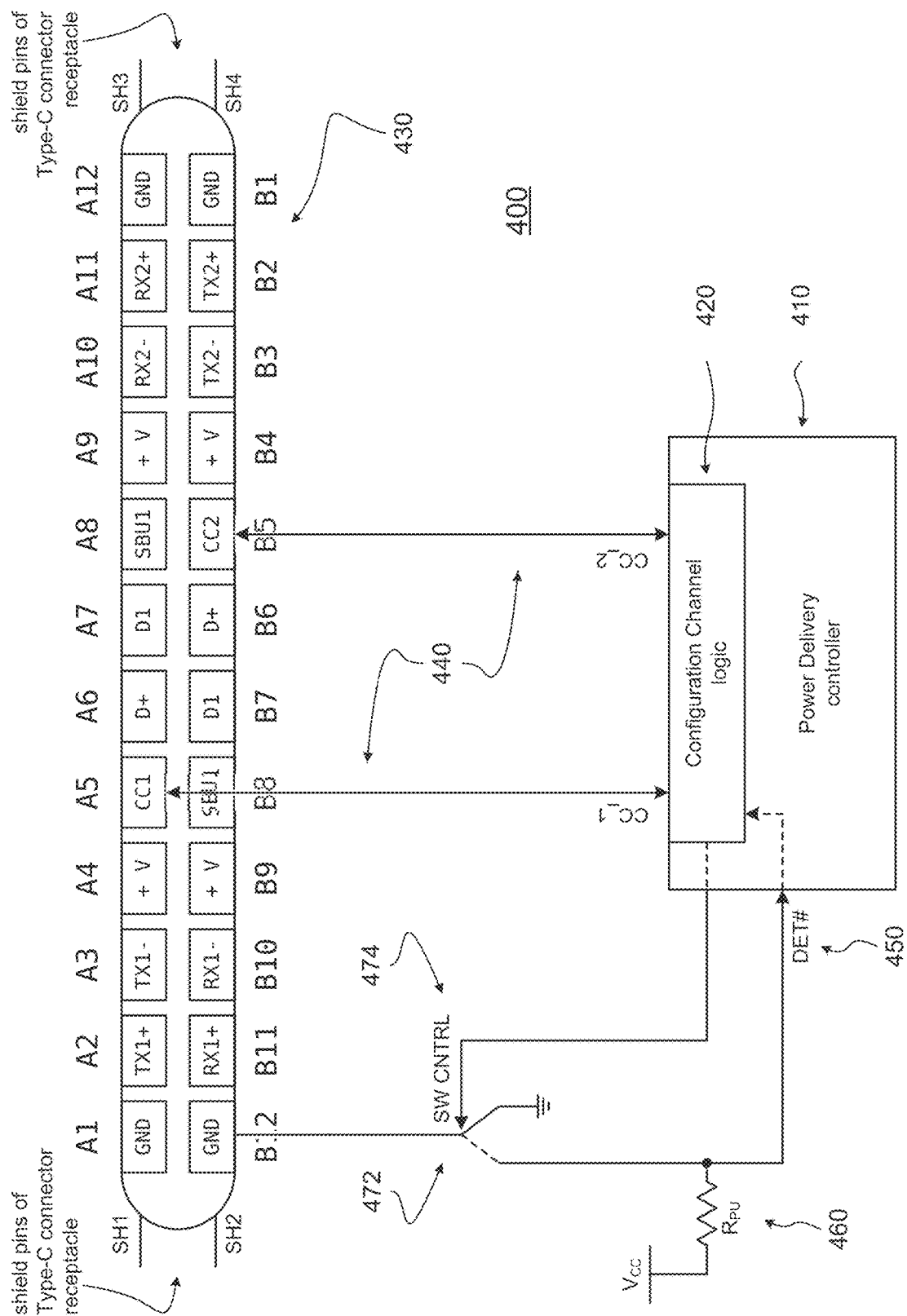
FIG. 4 illustrates a schematic view of a Type-C receptacle connector, in accordance with some embodiments of the disclosure.

FIG. 4 illustrates a schematic view of a Type-C receptacle connector, in accordance with some embodiments of the disclosure. A design 400 may comprise a PD controller 410, a CC logic 420, a receptacle pinout 430, CC lines 440, a DET # line 450, and a pull-up resistor $R_{PU}$ 460. These portions of design 400 may be substantially similar to similarly-named portions of design 300.

However, in contrast to design 300, design 400 comprises a switch 472, which may be operable to couple or connect the corresponding ground pin of receptacle pinout 430 (e.g., pin B12, or A1, or A12, or B1) either to ground, or to DET # line 450. Switch 472 may be controlled by a SW_CNTRL line 474 from PD controller 410.

When a Type-C connector plug is inserted into the Type-C connector receptacle, PD controller 410 may control switch 472 such that DET # line 450 from PD controller 410 is connected to the corresponding ground pin of receptacle pinout 430 (e.g., pin B12). By default, when no Type-C connector plug is inserted, DET # line 450 may be pulled to $V_{CC}$, which may make PD controller 410 not toggle CC lines 440. As soon as a Type-C connector plug is inserted into the Type-C connector receptacle, DET # line 450 may be pulled to a low voltage level. When PD controller 410 sees that low voltage level on DET # line 450 (which may be 0 volts (V), or a voltage corresponding with a logic 0), PD controller 410 may start to toggle CC lines 440. Once a device is attached with the help of CC lines 440, PD controller 410 may drive SW_CNTRL line 474 to make the corresponding ground pin of receptacle pinout 430 (e.g., pin B12) connected to ground instead of DET # line 450.

In some embodiments, Type-C connector receptacles may be modified by adding a spring case contact and a pin for the spring case contact. The pin of the spring case contact may again connect to PD controller 410, and the pin may be pulled to $V_{CC}$. When no Type-C connector plug is inserted, the spring may be ideal and PD controller 410 may refrain from toggling the CC logic. As soon as a Type-C connector plug is inserted into the Type-C connector receptacle, the plug may push the spring and make contact with the metal case, which may make PD controller 410 see a low voltage level (e.g., 0 V, or a logic 0) on the spring contact pin. Then PD controller 410 may then start toggling CC logic 420 for orientation and/or role identification.

For some embodiments (e.g., near-future embodiments), one or more pins may be added to Type-C connector receptacles for the detection of Type-C connector plug insertion.

Figure 5:
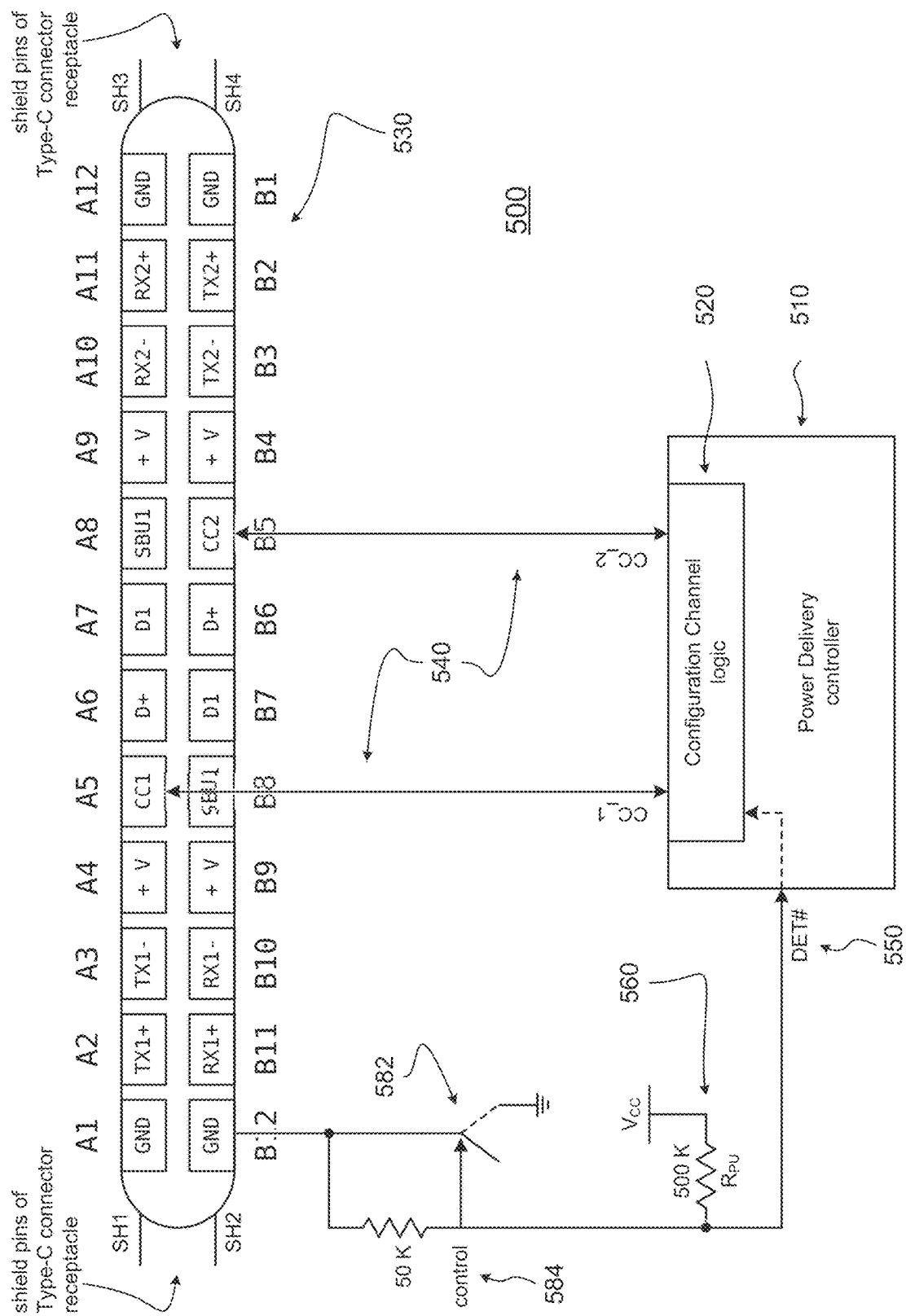
FIG. 5 illustrates a schematic view of a Type-C receptacle connector, in accordance with some embodiments of the disclosure.

FIG. 5 illustrates a schematic view of a Type-C receptacle connector, in accordance with some embodiments of the disclosure. A design 500 may comprise a PD controller 510, a CC logic 520, a receptacle pinout 530, CC lines 540, a DET # line 550, and a pull-up resistor $R_{PU}$ 560. These portions of design 500 may be substantially similar to similarly-named portions of design 300.

However, in contrast to design 300, design 500 comprises a switch 582 and a control logic 584. When no Type-C connector plug is inserted into the Type-C connector receptacle, since control logic 584 and other end of the Type-C connector have no connection, with the help of $R_{PU}$ 560, DET # line 550 may be sampled high by PD controller 510. When no Type-C connector plug is inserted, PD controller 510 may disable CC logic 520 (e.g., to save the power).

When a Type-C connector plug is inserted into the Type-C connector receptacle, the corresponding ground pin of receptacle pinout 530 (e.g., pin B12) may get connected to ground internally in the Type-C connector plug. Control logic 584 may connect the corresponding ground pin (e.g., pin B12) to a board ground, and at the same time, DET # line 550 may be sampled low by PD controller 510. Once DET # signal 550 is low, PD controller 510 may start toggling CC logic 540 for orientation.

The mechanisms may accordingly refrain from using CC logic 520 for disabling ground connection, providing a fully-hardware mechanism which may advantageously not depend upon PD firmware and/or any other platform component.

With respect to FIGS. 3-5, in a variety of embodiments, an apparatus may comprise an interface to a CC signal path (e.g., to one of CC lines 340) and to a ground signal path (e.g., a corresponding ground pin, such as pin B12) of a USB Type-C connector port, a first circuitry, and a second circuitry. The first circuitry (which may be substantially similar to, e.g., CC logic 320) may be operable to place toggled values on the CC signal path. The second circuitry (which may be a wire or a signal path of design 300) may be operable to couple the ground signal path to a detection signal path. The placement of the toggled values on the CC signal path may be enabled (e.g., by a PD controller 310) when the detection signal path carries a first value (e.g., a logic low level, or a value of "0") corresponding with the USB Type-C connector port being connected to a USB Type-C device. In contrast, the placement of the toggled values on the CC signal path may be disabled when the detection signal path carries a second value (e.g., a value other than a logic low value, such as a logic high value, or a value of "1") corresponding with the USB Type-C connector port not being connected to a USB Type-C device.

In some embodiments, the first circuitry may be part of a PD controller. For some embodiments, a power delivered to the first circuitry may be disabled when the detection signal path carries the second value. In some embodiments, the CC signal path may be a first CC signal path (e.g., a "CC1" signal path); and the interface may also be to a second CC signal path (e.g., a "CC2" signal path).

For some embodiments, the first circuitry may place toggled values on the second CC signal path. In some embodiments, the placement of the toggled values on the second CC signal path may be enabled when the detection signal path carries the first value, and the placement of the toggled values on the second CC signal path may be disabled when the detection signal path carries the second value.

In some embodiments, the detection signal path may be coupled by a resistor element to a power supply voltage rail VCC. Some embodiments may comprise a software-controllable signal coupled to the second circuitry (e.g., SW_CNTRL line 474). Upon the software-controllable signal having a predetermined value, the second circuitry may be operable to place the first value on the detection signal path.

A second variety of embodiments may pertain to Power saving in Standby and Connected Standby modes by synchronizing PD controller CC Logic. All Type-C ports in a system may support DRP (Dual Role Port) roles. In one role, if an external Type-C wall adaptor is connected (for example), the system may become a UFP and may start taking power from the wall adaptor. In another role, on the same port, when a flash drive is connected (for example), the system may become a DFP, and may start providing power to the flash drive. Moreover, in comparison with legacy Type-A (Host) to Type-B (Slave) cables, both ends of Type-C cables are the same, which may advantageously make connection of any two Type-C ports easy.

Meanwhile, systems may have multiple Type-C ports. For example, some systems may have one Type-C port for charging, one Type-C port for external display, and another Type-C port for connecting low speed peripherals (e.g., a mouse or a keyboard).

Since all Type-C ports support the DRP feature, and due to the similarity of the two ends of Type-C cables, it is possible to physically connect two Type-C ports of the same system to each other through a Type-C cable. In accordance with the DRP feature, both ports may then toggle between an offer to play the UFP role and an offer to play the DFP role. If the ports are toggling between offering to play the UFP role and offering to play the DFP role asynchronously with respect to each other, there may be a time when their offers are not conflicting (e.g., complementary termination is detected).

Accordingly, when two Type-C ports of same system are connected together with a cable, they may eventually connect such that one Type-C port may charge the other Type-C port. Since the received power generally goes through a battery charger (either buck or boost), power losses may be increased due to the conversion. This may in turn reduce the battery life of the system without doing any work. (In general, charger efficiency may be around 90%, and 5 V regulator may be around 85%. The remaining 10% of the charger and 15% of the 5 V regulator may be converted as a power loss.)

When connected in such a way, it may be advantageous for one Type-C port to not charge another Type-C port of the same system (which may contribute to power loss due to, for example, buck and boost action by the charger). In other words, it may be advantageous for the DRP-capable Type-C ports of a system to not negotiate between themselves and conclude that one Type-C port should supply power to the other Type-C port.

For the second variety of embodiments, synchronization between PD controllers of the same system may be implemented so that both ports may offer to play the same role, or expose the same role (e.g., the UFP role or the DFP role) at any point of time. When a first port of the system offers to play the DFP role, if the second port is synchronized with the first port, the second port may also offer to play the DFP role. Similarly, when the first port of the system offers to play the UFP role, if the second port is synchronized with the first port, the second port may also offer to play the UFP role. Accordingly, when the first port and the second part are synchronized, if a user connects a Type-C cable between Type-C ports of same system, the ports may both remain nonfunctional, and may instead endlessly negotiate between themselves regarding which will be the DFP and which will be the UFP.

Advantages of the mechanisms and methods disclosed herein may include: (1) reduction or elimination of power loss due to one Type-C port of the system supplying power to another Type-C port of the system; (2) straightforward implementation, which may use merely one common synchronization signal between PD controllers of different ports; and (3) users may potentially recognize that the nonfunctional ports indicate an invalid connection of Type-C ports, and may cease and/or refrain from connecting the ports in that manner.

Moreover, there may be various advantages to implementing the mechanisms and methods disclosed herein in hardware. First of all, for software implementations, a PD controller may go to an attach state and may activate a Type-C state machine that may be implemented in a microcontroller. For such PD controllers, power consumption in the attach state may be from around 3.0 mW to 6.0 mW (compared to around 0.5 mW in a non-attach state), and an additional 1.0 mW may be consumed by Rp and Rd voltage-divider resistors (PD controllers being attached). Since two PD controllers are looped back, the power consumption may be double (e.g., from around 7.0 mW to 13.0 mW). This power consumption may exist until a user disconnects. Such power consumption levels would be quite large considering the Connected Standby and Standby specifications. In comparison, a hardware-implementation PD controller might never go to an attach state, so power consumption may be negligible Secondly, software implementations may wake a system. In comparison, in hardware implementations, PD controllers might not come to know if any two Type-C ports are looped back with a cable, and may not go to an attach state. Waking the system from sleep states and Connected Standby states may accordingly be avoided.

Figure 6A:
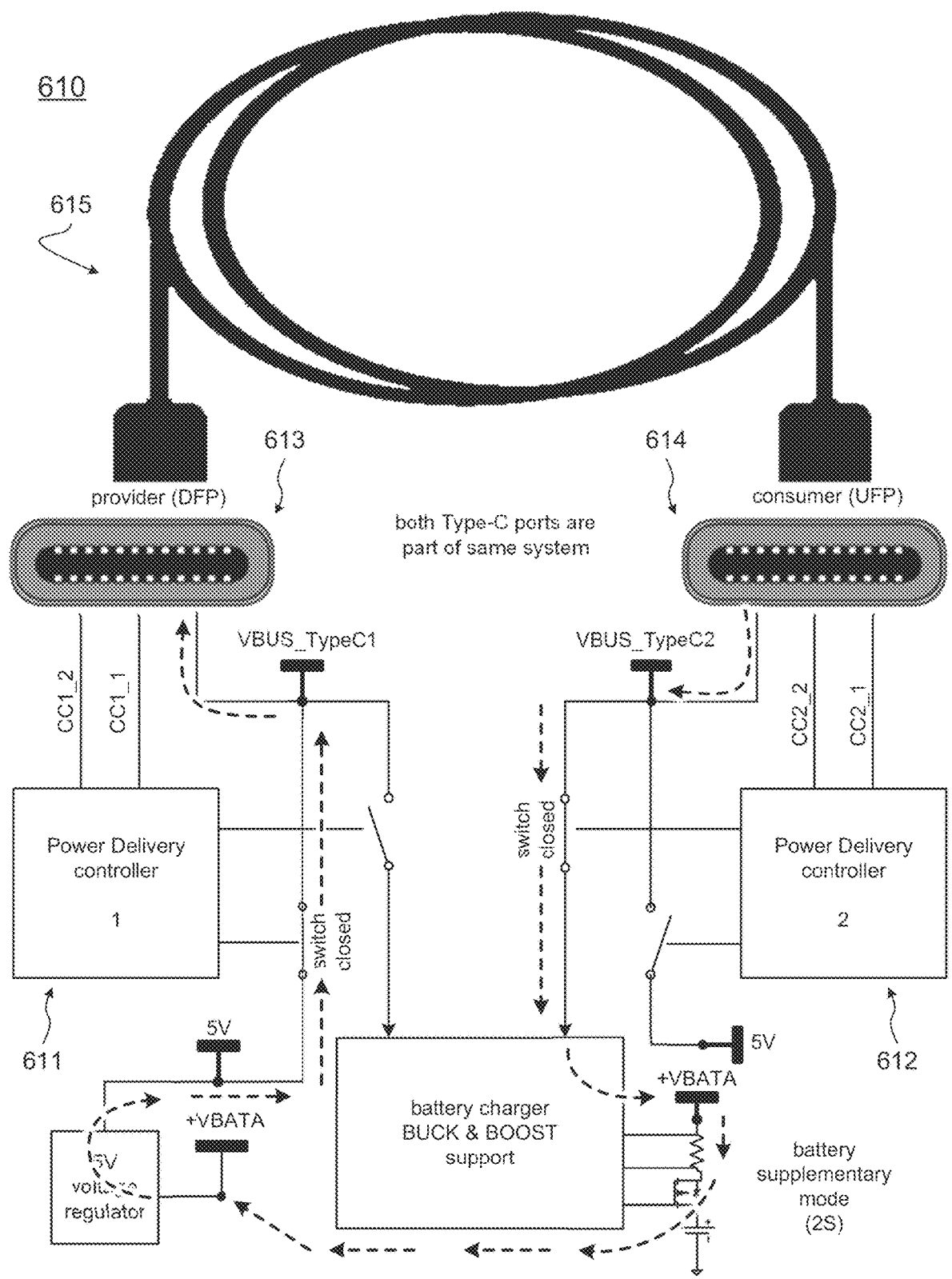
FIGS. 6A-6B illustrate a design of systems with two Type-C ports, in accordance with some embodiments of the disclosure.
Figure 6B:
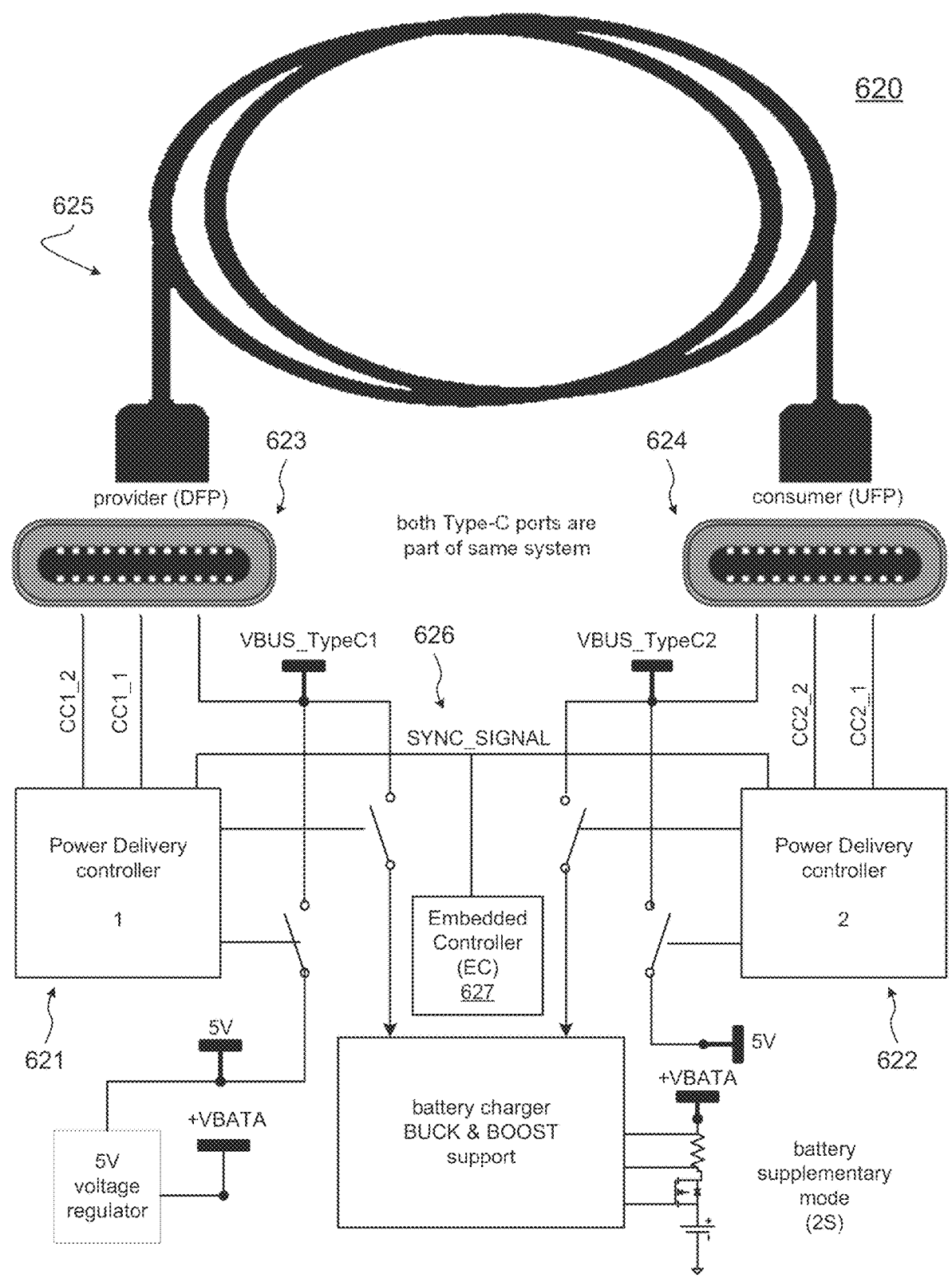

FIGS. 6A-6B illustrate a design of systems with two Type-C ports, in accordance with some embodiments of the disclosure. With respect to FIG. 6A, in a design 610, a first PD controller 611 and a second PD controller 612. First controller 611 may be coupled to a first USB Type-C connector port 613, and second controller 612 may be coupled to a second USB Type-C connector port 614. First Type-C connector port 613 may be connected to second Type-C connector port 614 via a Type-C cable 615.

In design 610, when a user connects Type-C ports of the same system to each other (whether intentionally or unintentionally), per specification, both may wait for complementary termination (e.g., they wait for the UFP/DFP roles of the DRP feature to be established). Eventually, if the ports are not synchronized, complementary termination may occur, at which point the ports will be connected.

Having established this kind of connection, one port may then become a sink for power (e.g., second Type-C connector port 614) and the other port may then become a source for power (e.g., first Type-C connector port 613). The same battery may then discharge, and charge again with the same power, which may result in a power loss to the system (e.g., due to power regulator conversion, such as buck and/or boost), and the battery life of system may be reduced without doing any work. (In general, charger efficiencies may be around 90%, and 5 V regulator efficiencies may be around 85%.)

With respect to FIG. 6B, in a design 620, a first PD controller 621 and a second PD controller 622. First PD controller 621 may be coupled to a first USB Type-C connector port 623, and second PD controller 622 may be coupled to a second USB Type-C connector port 624. First Type-C connector port 623 may be connected to second Type-C connector port 624 via a Type-C cable 625.

However, in comparison with design 610, design 620 also comprises an embedded controller 627 supplying a synchronization signal 626 to both first PD controller 621 and second PD controller 622. Synchronization signal 626 may accordingly be a common synchronization signal between all PD controllers for Type-C connector ports in a system.

When the system is powered on, all PD controllers (e.g., first PD controller 621 and second PD controller 622) may wait for the assertion of synchronization signal 626 from embedded controller 627. As a result, the assertion of synchronization signal 626 will synchronize all PD controllers, which will in turn synchronize the CC-line signaling between the PD controllers and all the corresponding Type-c connector ports, which will result in the CC lines of the Type-C cable starting to toggle, and being toggled, at the same time and in the same manner. The Type-C connector ports may therefore fail to detect complementary termination, and may remain nonfunctional.

Accordingly, if a user connects two Type-C connector ports of the same system together (e.g., first Type-C connector port 623 to second Type-C connector port 624), whether intentionally or unintentionally, since both the corresponding PD controllers are synchronized, both the ports will be either be offering to play the DFP role or the UFP roles at any point of time. This situation will prevent the creation of a valid Type-C connection, in compliance with the Type-C specification. Both Type-C connection ports will thus not be connected, and a $V_{BUS}$ voltage will not be supplied (by either port and to either port).

In some systems, a synchronization signal may be driven by a general-purpose Input/Output signal from a chipset component (e.g., a Platform Controller Hub (PCH)), or by one of the PD controllers.

Figure 7A:
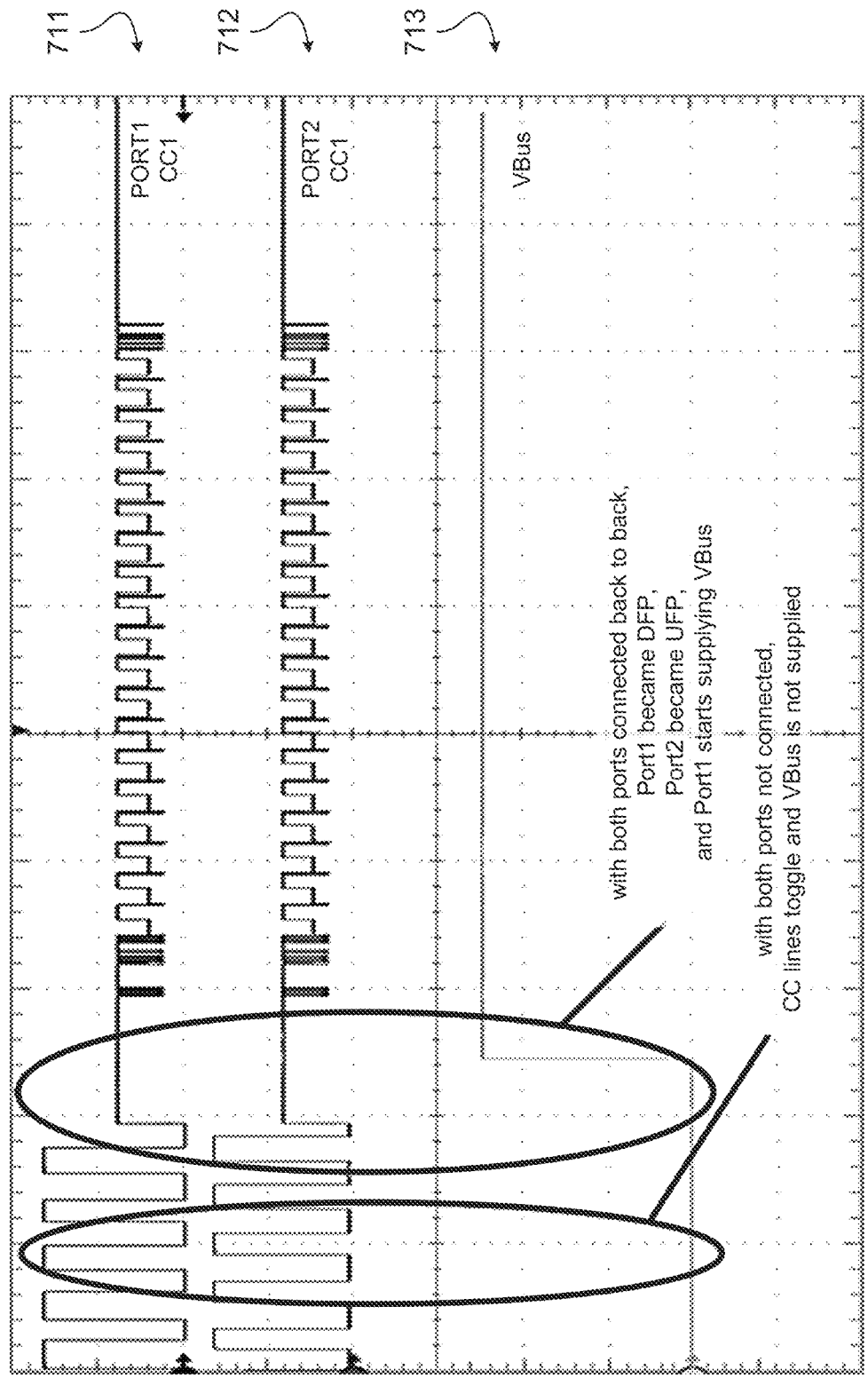
FIGS. 7A-7B illustrate timing diagrams pertaining to two Type-C ports connected to the same system, in accordance with some embodiments of the disclosure.
Figure 7B:
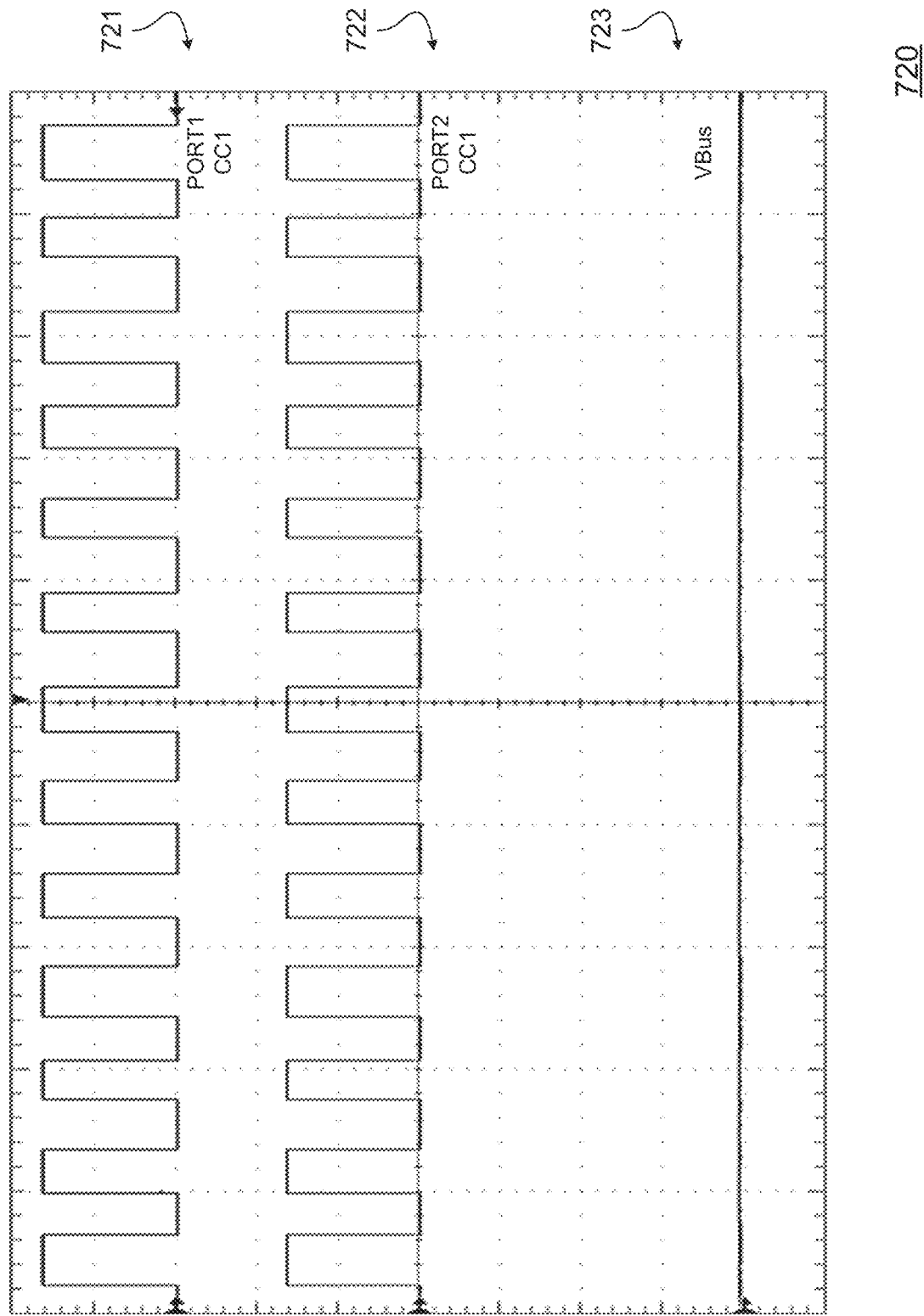

FIGS. 7A-7B illustrate timing diagrams pertaining to two Type-C ports connected to the same system, in accordance with some embodiments of the disclosure. With respect to FIG. 7A, a timing diagram 710 (which may correspond with design 610) depicts a first CC signal 711 of a first Type-C connection port, a second CC signal 712 of a second Type-C connection port of the same system, and a $V_{BUS}$ signal 713.

As discussed herein, in general, all Type-C connector ports in a system support DRP roles (e.g., UFP and DFP). At a time when no devices are attached to the first Type-C connection port and the second Type-C connection port, the CC lines for those port (e.g., first CC signal 711 and second CC signal 712) may each toggle between offering to play the DFP role (e.g., by exposing a pull-up on a CC line) and offering to play the UFP role (e.g., by exposing a pull-down on a CC line), at a time interval specified or predetermined by the Type-C specification (e.g., a 100 ms time period, with a duty cycle that may vary from 30% to 70%). Meanwhile, $V_{BUS}$ for both ports (e.g., $V_{BUS}$ signal 713) may be disconnected from the Type-C connector ports and/or the corresponding PD controllers.

At a later time, the Type-C connection ports may be connected to each other through a Type-C cable, and both Type-C connection ports may wait for complimentary termination to decide their roles. Once complementary termination is observed, first CC signal 711 and second CC signal 712 may stop toggling and may settle to a DC voltage level (e.g., based on pull-up and/or pull-down values for the CC lines). $V_{BUS}$ signal 713 may then be provided (e.g., by the first type-C connection port).

With respect to FIG. 7B, a timing diagram 720 (which may correspond with design 620) depicts a first CC signal 721 of a first Type-C connection port, a second CC signal 722 of a second Type-C connection port of the same system, and a $V_{BUS}$ signal 723.

In contrast with timing diagram 710, in timing diagram 720, first CC signal 721 and second CC signal 722 are being toggled by synchronized PD controllers. As a result, both first CC signal 721 and second CC signal 722 are toggling at the substantially the same time (e.g., with the same duty cycle), neither port find a complimentary termination, no Type-C connection is formed, CC detection will not work and $V_{BUS}$ will not be supplied.

With respect to FIGS. 6A-7B, in a variety of embodiments, an apparatus may comprise a first interface to a CC signal path of a first USB Type-C connector port, a second interface to a CC signal path of a second USB Type-C connector port, a first circuitry (which may be substantially similar to, e.g., first PD controller 621), a second circuitry (which may be substantially similar to, e.g., second PD controller 622), and a third circuitry (which may be substantially similar to embedded controller 627). The first circuitry may be operable to place toggled values on the CC signal path of the first USB Type-C connector port, in accordance with a first duty cycle. The second circuitry may be operable to place toggled values on the CC signal path of the second USB Type-C connector port, in accordance with a second duty cycle. The third circuitry may be operable to provide a synchronization signal to the first circuitry and the second circuitry. The first circuitry may be operable to begin the first duty cycle based upon the assertion of the synchronization signal.

In some embodiments, the second circuitry may be operable to begin the second duty cycle based upon the assertion of the synchronization signal. For some embodiments, the third circuitry may comprise an embedded controller that provides the synchronization signal.

For some embodiments, the first interface may also be to a second CC signal path of the first USB Type-C connector port, and the second interface may also be to a second CC signal path of the second USB Type-C connector port. The first circuitry may be operable to place toggled values on the second CC signal path of the first USB Type-C connector port, in accordance with the first duty cycle, and the second circuitry may be operable to place toggled values on the second CC signal path of the second USB Type-C connector port, in accordance with the second duty cycle.

In some embodiments, a software-accessible interface to expose the synchronization signal to at least one of: software reads; and software writes. For some embodiments, a $V_{BUS}$ supply voltage rail is supplied for the first interface. In some embodiments, the assertion of the synchronization signal may prevent the $V_{BUS}$ supply voltage from being supplied to the first USB Type-C connector port.

Figure 8:
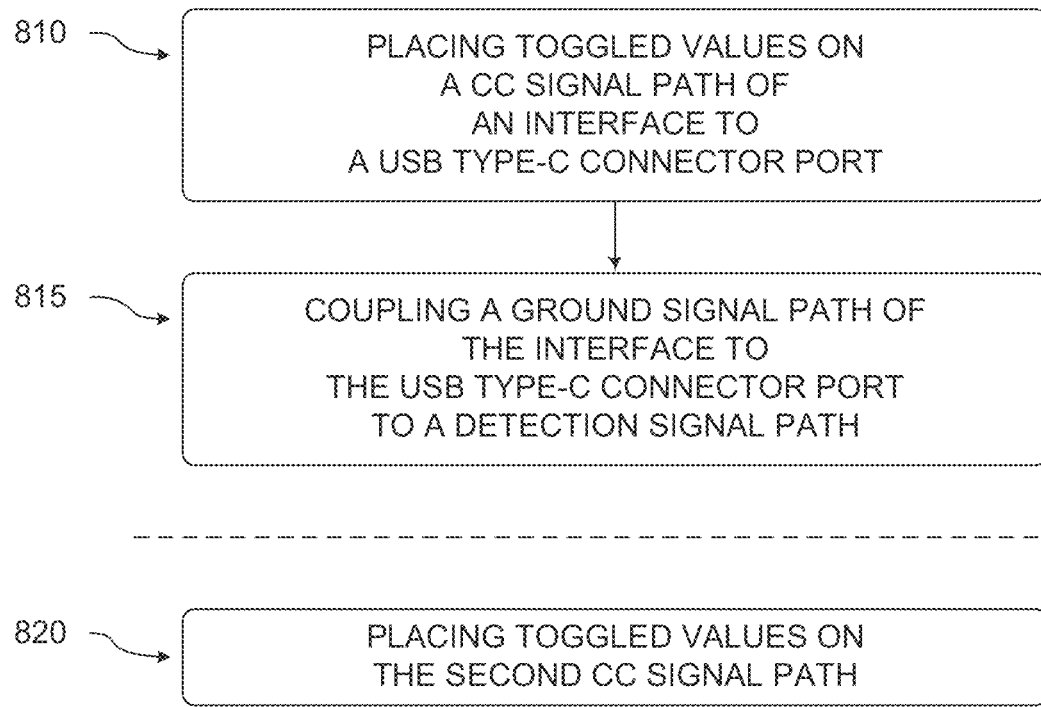
FIG. 8 illustrates methods of saving power by turning off Power Delivery (PD) controller Configuration Channel (CC) circuitry, in accordance with some embodiments of the disclosure.

FIG. 8 illustrates methods of saving power by turning off PD controller CC circuitry, in accordance with some embodiments of the disclosure. A method 800 may comprise a placing 810 and a coupling 815. For some embodiments, method 800 may comprise a placing 820.

In placing 810, toggled values may be placed on a CC signal path of an interface to a USB Type-C connector port. In coupling 815, a ground signal path of the interface to the USB Type-C connector port may be coupled to a detection signal path. The placement of the toggled values on the CC signal path may be enabled when the detection signal path carries a first value that corresponds with the USB Type-C connector port being connected to a USB Type-C device, and may be disabled when the detection signal path carries a second value that corresponds with the USB Type-C connector port not being connected to a USB Type-C device.

In some embodiments, the toggled values may be placed on the CC signal path of the interface via a CC logic, and the detection signal path may be coupled by a resistor element to a power supply voltage rail VCC. For some embodiments, a power delivered to the CC logic may be disabled when the detection signal path carries the second value. In some embodiments, the CC signal path may be a first CC signal path, and the interface may also be to a second CC signal path.

For placing 820, toggled values may be placed on the second CC signal path. The placement of the toggled values on the second CC signal path may be enabled when the detection signal path carries the first value, and may be disabled when the detection signal path carries the second value.

In some embodiments, upon a software-controllable signal having a predetermined value, the first value may be placed on the detection signal path.

Figure 9:
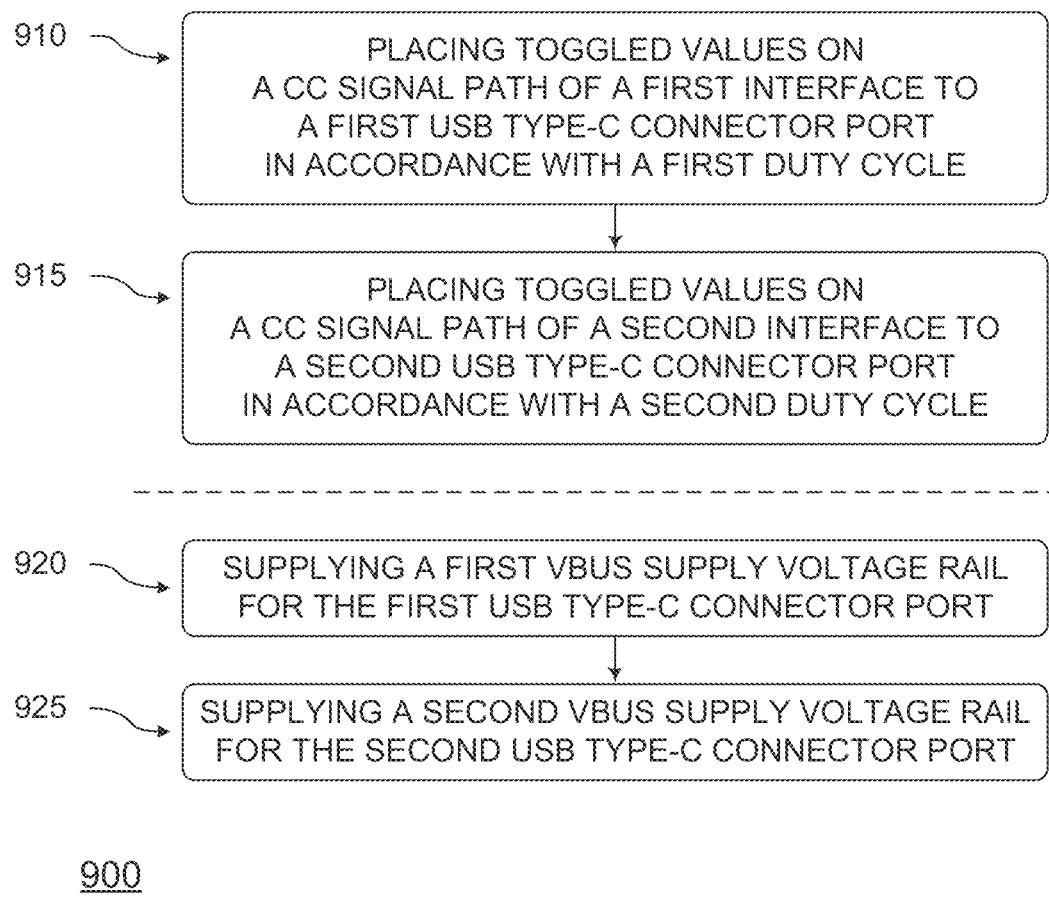
FIG. 9 illustrates methods of saving power by synchronizing PD controller CC circuitry, in accordance with some embodiments of the disclosure.

FIG. 9 illustrates methods of saving power by synchronizing PD controller CC circuitry, in accordance with some embodiments of the disclosure. A method 900 may comprise a placing 910 and a placing 915. In some embodiments, method 900 may comprise a supplying 920 and a supplying 925.

[In placing 910, toggled values may be placed on a CC signal path of a first interface to a first USB Type-C connector port, in accordance with a first duty cycle. In placing 915, toggled values may be placed on a CC signal path of a second interface to a second USB Type-C connector port, in accordance with a second duty cycle. The first duty cycle may begin based upon the assertion of a synchronization signal.

In some embodiments, the second duty cycle may begin based upon the assertion of the synchronization signal. For some embodiments, an embedded controller may provide the synchronization signal.

In some embodiments, the first interface may also be to a second CC signal path of the first USB Type-C connector port, and the second interface may also be to a second CC signal path of the second USB Type-C connector port. For some embodiments, the toggled values may be placed on the second CC signal path of the first USB Type-C connector port, in accordance with the first duty cycle, and the toggled values may be placed on the second CC signal path of the second USB Type-C connector port, in accordance with the second duty cycle. In some embodiments, a software-accessible interface may expose the synchronization signal to software reads and/or software writes.

For some embodiments, in supplying 920, a $V_{BUS}$ supply voltage rail may be supplied for the first USB Type-C connector port. In some embodiments, the assertion of the synchronization signal may prevent the $V_{BUS}$ supply voltage from being supplied to the first USB Type-C connector port.

Although the actions in the flowcharts with reference to FIGS. 8 and 9 are shown in a particular order, the order of the actions can be modified. Thus, the illustrated embodiments can be performed in a different order, and some actions may be performed in parallel. Some of the actions and/or operations listed in FIGS. 8 and 9 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIGS. 8 and 9.

Moreover, in some embodiments, machine readable storage media may have executable instructions that, when executed, cause one or more processors to perform an operation comprising a method of FIGS. 8 and 9. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 10:
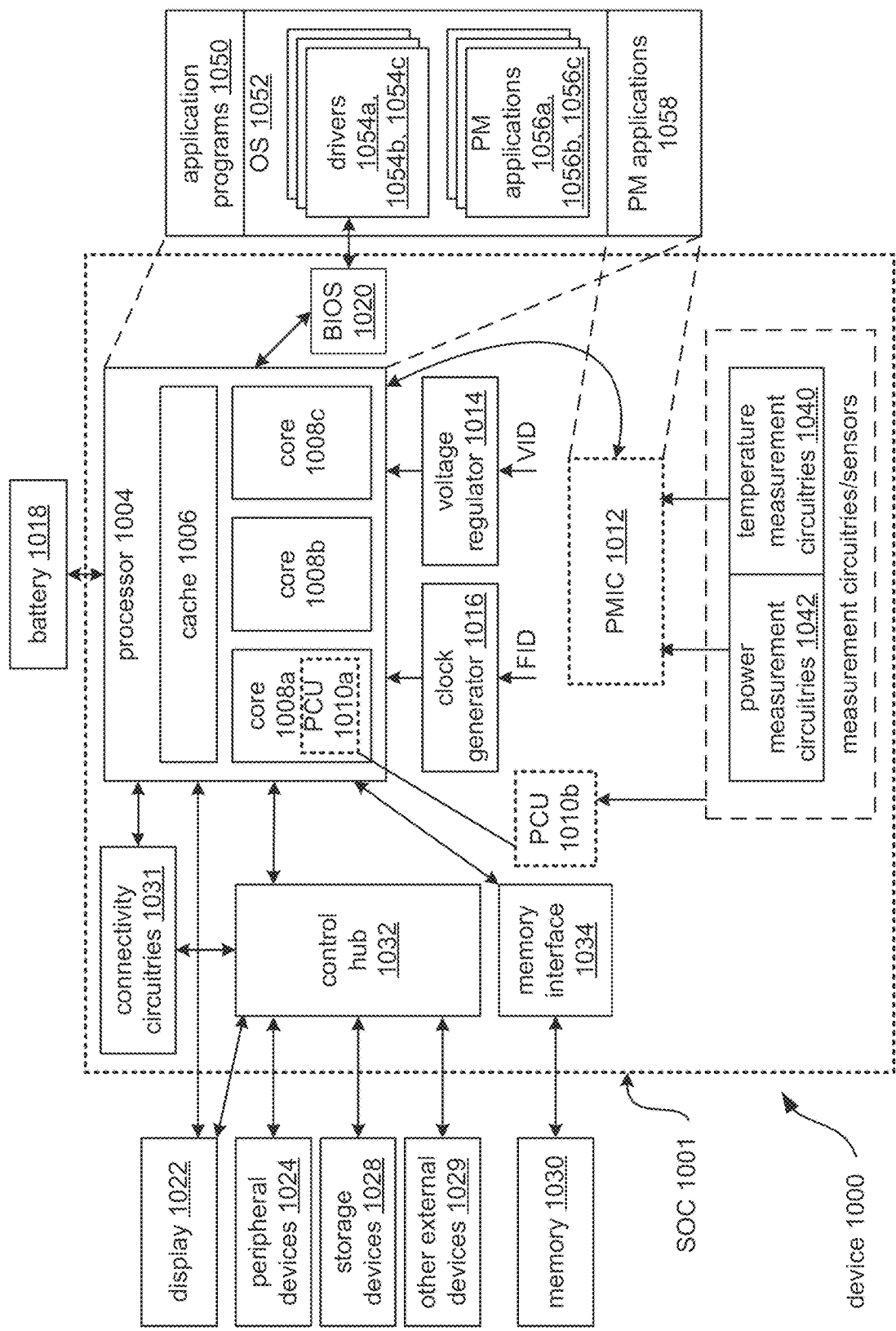
FIG. 10 illustrates a computer system or computing device with mechanisms to facilitate power saving in Type-C connectors, in accordance with some embodiments.

FIG. 10 illustrates a computer system or computing device with mechanisms to facilitate power saving in Type-C connectors, in accordance with some embodiments. It is pointed out that those elements of FIG. 10 having the same reference numbers (or names) as the elements of any other figure may operate or function in any manner similar to that described, but are not limited to such.

In some embodiments, a device 1000 may comprise an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 1000.

In some embodiments, device 1000 may comprise a System-on-Chip (SoC) 1001. An example boundary of SoC 1001 is depicted using dotted lines in FIG. 10, with some example components depicted as being included within SoC 1001. However, SoC 1001 may include any appropriate components of device 1000.

In some embodiments, device 1000 may comprise a processor 1004. Processor 1004 may include one or more physical devices, such as microprocessors, application processors, microcontrollers, programmable logic devices, processing cores, or other processing means. The processing operations performed by processor 1004 may include the execution of an operating system or an operating platform on which applications and/or device functions are, in turn, executed. The processing operations may include operations related to I/O (input/output) either with a human user or with other devices, operations related to power management, operations related to connecting computing device 1000 to another device, and/or the like. The processing operations may also include operations related to audio I/O and/or display I/O.

In some embodiments, processor 1004 may comprise multiple processing cores 1008a, 1008b, and 1008c (also referred to as cores). Although three cores 1008a, 1008b, and 1008c are depicted in FIG. 10, processor 1004 may include any appropriate number of cores, e.g., tens of cores or even hundreds of cores. Cores 1008a, 1008b, and/or 1008c may be implemented on a single integrated circuit (IC) chip. Moreover, the chip may include one or more shared and/or private caches, buses or interconnections, graphics and/or memory controllers, and/or other components.

In some embodiments, processor 1004 may comprise a cache 1006. In some embodiments, sections of cache 1006 may be dedicated to individual cores (e.g., a first section of cache 1006 may be dedicated to core 1008a, a second section of cache 1006 may be dedicated to core 1008b, and so on). For some embodiments, one or more sections of cache 1006 may be shared among two or more of the cores. Cache 1006 may be split into different levels, e.g., a level 1 (L1) cache, a level 2 (L2) cache, a level 3 (L3) cache, and so on.

In some embodiments, cores 1008a, 1008b, and/or 1008c may include a fetch unit to fetch instructions (including instructions with conditional branches) for execution by the core. The instructions may be fetched from a memory 1030 (which may comprise any of a variety of storage devices). Cores 1008a, 1008b, and/or 1008c may also include a decode unit to decode the fetched instruction. For some embodiments, the decode unit may decode fetched instruction into a plurality of micro-operations. Cores 1008a, 1008b, and/or 1008c may also include a schedule unit to perform various operations associated with storing decoded instructions. In some embodiments, the schedule unit may hold data from the decode unit until the instructions are ready for dispatch, e.g., until all source values of a decoded instruction become available. For some embodiments, the schedule unit may schedule and/or issue (or dispatch) decoded instructions to an execution unit for execution.

The execution unit may execute dispatched instructions after they are decoded (e.g., by the decode unit) and dispatched (e.g., by the schedule unit). In some embodiments, the execution unit may include more than one type of execution unit (such as an imaging computational unit, a graphics computational unit, a general-purpose computational unit, and so on). The execution unit may also perform various arithmetic operations such as addition, subtraction, multiplication, and/or division, and may include one or more arithmetic logic units (ALUs). For some embodiments, a co-processor (not shown) may perform various arithmetic operations in conjunction with the execution unit.

Furthermore, the execution unit may execute instructions out-of-order. Accordingly, in some embodiments, cores 1008a, 1008b, and/or 1008c may comprise an out-of-order processor core. Cores 1008a, 1008b, and/or 1008c may also include a retirement unit. The retirement unit may retire executed instructions after they are committed. For some embodiments, retirement of the executed instructions may result in processor state being committed from the execution of the instructions, physical registers used by the instructions being de-allocated, and so on. Cores 1008a, 1008b, and/or 1008c may also include a bus unit to enable communication between components of the core and other components via one or more buses. Cores 1008a, 1008b, and/or 1008c may additionally include one or more registers to store data accessed by various components of the core (such as values related to assigned app priorities and/or sub-system states (modes) association.

In some embodiments, device 1000 may comprise one or more connectivity circuitries 1031, which may include hardware devices (e.g., wireless and/or wired connectors and communication hardware) and/or software components (e.g., drivers, protocol stacks, and so on) to enable device 1000 to communicate with external devices. Device 1000 may be separate from the external devices, such as other computing devices, wireless access points or base stations, and so on.

In some embodiments, connectivity circuitries 1031 may include circuitries directed toward multiple different types of connectivity (e.g., connectivity protocols). To generalize, connectivity circuitries 1031 may include cellular connectivity circuitries, wireless connectivity circuitries, and so on. Cellular connectivity circuitries of connectivity circuitries 1031 may refer generally to cellular network connectivity provided by wireless carriers, such as via GSM (global system for mobile communications) or variations or derivatives thereof, via CDMA (code division multiple access) or variations or derivatives thereof, via TDM (time division multiplexing) or variations or derivatives thereof, via 3rd Generation Partnership Project (3GPP) Universal Mobile Telecommunications Systems (UMTS) system or variations or derivatives thereof, via 3GPP Long-Term Evolution (LTE) system or variations or derivatives thereof, via 3GPP LTE-Advanced (LTE-A) system or variations or derivatives thereof, via Fifth Generation (5G) wireless system or variations or derivatives thereof, via 5G mobile networks system or variations or derivatives thereof, via 5G New Radio (NR) system or variations or derivatives thereof, or via other cellular service standards.

Wireless connectivity circuitries (or wireless interfaces) of connectivity circuitries 1031 may refer generally to wireless connectivity that is not cellular, and may include personal area networks (such as Bluetooth, Near Field, and so on), local area networks (such as Wi-Fi), wide area networks (such as WiMax), and/or other wireless communication. For some embodiments, connectivity circuitries 1031 may include a network interface, such as a wired or wireless interface, so that a system embodiment may be incorporated into a wireless device (for example, into a cell phone or a personal digital assistant).

In some embodiments, device 1000 may comprise a control hub 1032, which may represent hardware devices and/or software components related to interaction with one or more I/O devices. Control hub 1032 may be a chipset, a Platform Control Hub (PCH), and/or the like. Via control hub 1032, processor 1004 may communicate with a display 1022 (or one or more displays), one or more peripheral devices 1024, one or more storage devices 1028, one or more other external devices 1029, and so on.

Control hub 1032 may provide one or more connection points for additional devices that connect to device 1000, through which a user might interact with the system. In some embodiments, devices that can be attached to device 1000 (e.g., external devices 1029) may include microphone devices, speaker or stereo systems, audio devices, video systems or other display devices, keyboard or keypad devices, and/or other I/O devices for use with specific applications such as card readers or other devices.

As mentioned above, control hub 1032 can interact with audio devices, display 1022, and so on. In some embodiments, input through a microphone or other audio device may provide input or commands for one or more applications or functions of device 1000. Additionally, audio output may be provided instead of, or in addition to display output. For some embodiments, if display 1022 includes a touch screen, display 1022 may also act as an input device, which may be at least partially managed by control hub 1032. There may also be additional buttons or switches on computing device 1000 to provide I/O functions managed by control hub 1032. In some embodiments, control hub 1032 may manage devices such as accelerometers, cameras, light sensors or other environmental sensors, or other hardware that can be included in device 1000. The input may be part of direct user interaction, and may also provide environmental input to the system to influence its operations (such as filtering for noise, adjusting displays for brightness detection, applying a flash for a camera, or other features).

In some embodiments, control hub 1032 may couple to various devices using any appropriate communication protocol, e.g., PCIe (Peripheral Component Interconnect Express), USB (Universal Serial Bus), USB Type-C, Thunderbolt, High Definition Multimedia Interface (HDMI), Firewire, and so on.

In some embodiments, display 1022 may represent hardware components (e.g., display devices) and software components (e.g., drivers) that provide a visual and/or tactile display for a user to interact with device 1000. Display 1022 may include a display interface, a display screen, and/or hardware device used to provide a display to a user. In some embodiments, display 1022 may include a touch screen (or touch pad) device that provides both output and input to a user. In some embodiments, display 1022 may communicate directly with processor 1004. Display 1022 may be an internal display device (e.g., as in a mobile electronic device or a laptop device) or an external display device attached via a display interface (e.g., DisplayPort, and so on). For some embodiments, display 1022 may be a head mounted display (HMD) such as a stereoscopic display device for use in virtual reality (VR) applications or augmented reality (AR) applications.

In some embodiments, in addition to (or instead of) processor 1004, device 1000 may include a Graphics Processing Unit (GPU) (not depicted in the figure). The GPU may comprise one or more graphics processing cores, which may control one or more aspects of displaying contents on display 1022.

For some embodiments, control hub 1032 may include hardware interfaces and connectors, as well as software components (e.g., drivers, protocol stacks, and so on) to make peripheral connections, e.g., to peripheral devices 1024. In various embodiments, control hub 1032 may comprise mechanisms to facilitate power saving in Type-C connectors, as disclosed herein.

It will be understood that device 1000 could both be a peripheral device to other computing devices, as well as have peripheral devices connected to it. Device 1000 may have a "docking" connector to connect to other computing devices for purposes such as managing content (e.g., downloading and/or uploading, changing, and/or synchronizing content) on device 1000. Additionally, a docking connector may allow device 1000 to connect to certain peripherals that allow computing device 1000 to control content output (e.g., to audiovisual systems and/or other systems).

In addition to a proprietary docking connector or other proprietary connection hardware, device 1000 may make peripheral connections via common or standards-based connectors. Such connectors may include a Universal Serial Bus (USB) connector (which may include any of a number of different hardware interfaces), a USB Type-C connector, a DisplayPort connector or MiniDisplayPort (MDP) connector, a High Definition Multimedia Interface (HDMI) connector, a Firewire connector, or other types of connectors. Accordingly, peripheral devices 1024 may comprise Type-C connectors, as disclosed herein.

In some embodiments, connectivity circuitries 1031 may be coupled to control hub 1032, e.g., in addition to, or instead of, being coupled directly to processor 1004. In some embodiments, display 1022 may be coupled to control hub 1032, e.g., in addition to, or instead of, being coupled directly to processor 1004.

In some embodiments, device 1000 may comprise memory 1030, which may be coupled to processor 1004 via a memory interface 1034. Memory 1030 may include memory devices for storing information in device 1000. Memory devices may include nonvolatile memory devices (for which state might not change if power to the memory device is interrupted) and/or volatile memory devices (for which state may be indeterminate, or lost, if power to the memory device is interrupted). Memory 1030 may comprise a dynamic random access memory (DRAM) device, a static random access memory (SRAM) device, a flash memory device, a phase-change memory device, or another memory device (e.g., a memory device having performance suitable for serving as process memory). In some embodiments, memory 1030 may operate as system memory for device 1000, to store data and instructions for use when the one or more processors (e.g., processor 1004) executes an application or process. Memory 1030 may store application data, user data, music, photos, documents, or other data, as well as system data (whether long-term or temporary) related to the execution of the applications and functions of device 1000.

Elements of various embodiments and examples may also be provided as a machine-readable medium (e.g., memory 1030) for storing the computer-executable instructions (e.g., instructions to implement any other processes discussed herein). The machine-readable medium (e.g., memory 1030) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. Some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, one or more measurement circuitries and/or sensors of device 1000 may comprise temperature measurement circuitries 1040, e.g., for measuring temperature of various components of device 1000. In some embodiments, temperature measurement circuitries 1040 may be embedded, or coupled or attached to various components, whose temperature are to be measured and monitored. For some embodiments, temperature measurement circuitries 1040 may measure temperatures of (or within) one or more of cores 1008*a*, 1008*b*, 1008*c*, a voltage regulator 1014, memory 1030, a mother-board of SoC 1001, and/or any other appropriate component of device 1000.

In some embodiments, the measurement circuitries and/or sensors of device 1000 may comprise one or more power measurement circuitries 1042, e.g., for measuring power consumed by one or more components of the device 1000.

For some embodiments, power measurement circuitries 1042 may measure power, voltage, and/or current. In some embodiments, power measurement circuitries 1042 may be embedded, coupled, or attached to various components whose power, voltage, and/or current consumption are to be measured and monitored. For some embodiments, power measurement circuitries 1042 may measure: power, voltage, and/or current supplied by voltage regulator 1014 (which may comprise one or more voltage regulator); power supplied to SoC 1001; power supplied to device 1000; power consumed by processor 1004 (or any other component) of device 1000; and so on.

In some embodiments, device 1000 may comprise one or more voltage regulator circuitries in voltage regulator 1014. Voltage regulator 1014 may generate signals at appropriate voltage levels, which may be supplied to operate any appropriate components of the device 1000. As an example, voltage regulator 1014 is depicted as supplying one or more signals (e.g., voltage signals) to processor 1004 of device 1000. In some embodiments, voltage regulator 1014 may receive one or more Voltage Identification (VID) signals, and generates the voltage signals (e.g., to processor 1004) at appropriate levels, based on the VID signals. Various type of VRs may be utilized for voltage regulator 1014. In some embodiments, voltage regulator 1014 may include a "buck" voltage regulator, a "boost" voltage regulator, a combination of buck and boost voltage regulators, low dropout (LDO) regulators, switching DC-DC regulators, and so on. Buck voltage regulators may be used in power delivery applications in which an input voltage is transformed to an output voltage in a ratio that is smaller than unity. Boost voltage regulators may be used in power delivery applications in which an input voltage is transformed to an output voltage in a ratio that is larger than unity. In some embodiments, each processor core may have its own voltage regulator, which may be controlled by a Power Control Unit (PCU) 1010*a*, a PCU 1010*b*, and/or a Power Management Integrated Circuit (PMIC) 1012. In some embodiments, each core may have a network of distributed LDOs to provide efficient control for power management. The LDOs may be digital, analog, or a combination of digital or analog LDOs.

In some embodiments, device 1000 may comprise one or more clock generator circuitries in a clock generator 1016. Clock generator 1016 generates clock signals at appropriate frequency levels, which may be supplied to any appropriate components of device 1000. As an example, clock generator 1016 is depicted as supplying clock signals to processor 1004 of device 1000. In some embodiments, clock generator 1016 may receive one or more Frequency Identification (FID) signals, and may generate the clock signals at an appropriate frequency, based on the FID signals.

In some embodiments, device 1000 may comprise a battery 1018 supplying power to various components of device 1000. As an example, battery 1018 is depicted as supplying power to processor 1004. Although not depicted in the figures, device 1000 may comprise a charging circuitry, e.g., to recharge the battery based on an Alternating Current (AC) power supply received from an AC adapter.

In some embodiments, device 1000 may comprise PCU 1010*a* and/or PCU 1010*b* (which may also be referred to as Power Management Units (PMUs), Power Controllers, and so on). In some embodiments, PCU 1010*a* may be implemented by one or more of cores 1008*a*, 1008*b*, and/or 1008*c*, as is symbolically depicted using a dotted box labeled PCU 1010*a*. For some embodiments, PCU 1010*b* may be implemented outside the cores, as is symbolically depicted using a dotted box labeled PCU 1010*b*. PCU 1010*a* and/or PCU 1010*b* may implement various power management operations for device 1000. PCU 1010*a* and/or PCU 1010*b* may include hardware interfaces, hardware circuitries, connectors, registers, and so on, as well as software components (e.g., drivers, protocol stacks), to implement various power management operations for device 1000.

In some embodiments, device 1000 may comprise PMIC 1012, e.g., to implement various power management operations for device 1000. In some embodiments, PMIC 1012 may be a Reconfigurable Power Management ICs (RPMICs) and/or an IMVP (Intel® Mobile Voltage Positioning). In some embodiments, the PMIC may be within an IC chip separate from processor 1004. The may implement various power management operations for device 1000. PMIC 1012 may include hardware interfaces, hardware circuitries, connectors, registers, and so on, as well as software components (e.g., drivers, protocol stacks), to implement various power management operations for device 1000. In various embodiments, PMIC 1012 may comprise mechanisms to facilitate power saving in Type-C connectors, as disclosed herein.

For some embodiments, device 1000 may comprise PCU 1010*a*, PCU 1010*b*, and/or PMIC 1012. In some embodiments, any one of PCU 1010*a*, PCU 1010*b*, and/or PMIC 1012 may be absent in device 1000, and hence, these components are depicted using dotted lines.

Various power management operations of device 1000 may be performed by PCU 1010*a*, PCU 1010*b*, PMIC 1012, or by a combination thereof. For some embodiments, PCU 1010*a*, PCU 1010*b*, and/or PMIC 1012 may select a power state (e.g., a P-state) for various components of device 1000. In some embodiments, PCU 1010*a*, PCU 1010*b*, and/or PMIC 1012 may select a power state for various components of device 1000 (e.g., in accordance with the ACPI (Advanced Configuration and Power Interface) specification). In some embodiments, for example, PCU 1010*a*, PCU 1010*b*, and/or PMIC 1012 may cause various components of the device 1000 to transition to a sleep state, to an active state, to an appropriate C state (e.g., C0 state, or another appropriate C state, in accordance with the ACPI specification), and so on.

For some embodiments, PCU 1010*a*, PCU 1010*b*, and/or PMIC 1012 may control a voltage output by voltage regulator 1014 and/or a frequency of a clock signal output by the clock generator, e.g., by outputting the VID signals and/or the FID signals, respectively. In some embodiments, PCU 1010*a*, PCU 1010*b*, and/or PMIC 1012 may control battery power usage, charging of battery 1018, and features related to power saving operation.

Clock generator 1016 may comprise a phase locked loop (PLL), frequency locked loop (FLL), or any suitable clock source. In some embodiments, each core of processor 1004 may have its own clock source. As such, each core may operate at a frequency independent of the frequency of operation of the other core. In some embodiments, PCU 1010*a*, PCU 1010*b*, and/or PMIC 1012 may perform adaptive or dynamic frequency scaling or adjustment. For some embodiments, clock frequency of a processor core may be increased if the core is not operating at its maximum power consumption threshold or limit. In some embodiments, PCU 1010*a*, PCU 1010*b*, and/or PMIC 1012 may determine the operating condition of each core of a processor, and may opportunistically adjust frequency and/or power supply voltage of that core without the core clocking source (e.g., a PLL of that core) losing lock when PCU 1010*a*, PCU 1010*b*, and/or PMIC 1012 determines that the core is operating below a target performance level. In some embodiments, if a core is drawing current from a power supply rail less than a total current that is allocated for that core (or for processor 1004), then PCU 1010*a*, PCU 1010*b*, and/or PMIC 1012 may temporality increase the power draw for that core (or for processor 1004), for example, by increasing a clock frequency and/or a power supply voltage level, so that the core or processor 1004 can perform at a higher performance level. As such, in various embodiments, voltage and/or frequency may be increased temporality for processor 1004 without violating product reliability.

For some embodiments, PCU 1010*a*, PCU 1010*b*, and/or PMIC 1012 may perform power management operations, e.g., based at least in part on receiving measurements from power measurement circuitries 1042, temperature measurement circuitries 1040, charge level of battery 1018, and/or any other appropriate information that may be used for power management. To that end, PMIC 1012 may be communicatively coupled to one or more sensors to sense and/or detect various values of and/or variations in one or more factors having an effect on power and/or thermal behavior of the system or platform. Examples of the one or more factors may include electrical current, voltage droop, temperature, operating frequency, operating voltage, power consumption, inter-core communication activity, and so on. Sensors for one or more of these factors may be provided in physical proximity to (and/or in thermal contact with or thermally coupled to) one or more components or logic/IP blocks of a computing system (e.g., a computing system of device 1000). Additionally, in some embodiments, sensor(s) may be directly coupled to PCU 1010*a*, PCU 1010*b*, and/or PMIC 1012 to allow PCU 1010*a*, PCU 1010*b*, and/or PMIC 1012 to manage processor core energy at least in part based on value(s) detected by one or more of the sensors.

Also depicted is an example software stack of device 1000 (although not all elements of the software stack are depicted). In various embodiments, processor 1004 may execute application programs 1050, Operating System (OS) 1052, one or more Power Management (PM) specific application programs (e.g., generically referred to as PM applications 1058), and/or the like. PM applications 1058 may also be executed by PCU 1010*a*, PCU 1010*b*, and/or PMIC 1012. OS 1052 may also include one or more PM applications 1056*a*, 1056*b*, 1056*c*, and so on. OS 1052 may also include various drivers 1054*a*, 1054*b*, 1054*c*, and so on, some of which may be specific for power management purposes. In some embodiments, device 1000 may further comprise a Basic Input/Output System (BIOS) 1020. BIOS 1020 may communicate with OS 1052 (e.g., via one or more of drivers 1054*a*, 1054*b*, 1054*c*, and so on), communicate with processor 1004, and so on.

In various embodiments, one or more of PM applications 1058, drivers that OS 1052 includes (e.g., drivers 1054*a*, 1054*b*, 1054*c*, and so on), PM applications that OS 1052 includes (e.g., PM applications 1056*a*, 1056*b*, 1056*c*, and so on), BIOS 1020, and so on may be used to implement power management specific tasks. For example, these components may be used to control voltage and/or frequency of various components of device 1000, to control wake-up state, sleep state, and/or any other appropriate power state of various components of device 1000, to control battery power usage, to control a charging of the battery 1018, to control features related to power saving operation, and so on.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    an interface to a Configuration Channel (CC) signal path and to a ground signal path of a Universal Serial Bus (USB) Type-C connector port;
    a switch coupled to the ground signal path, the switch to selectively couple the ground signal path to a ground terminal or a detection signal path;
    CC logic to place toggled values on the CC signal path; and
    control circuitry coupled to the detection signal path and the CC logic, wherein the control circuitry is to:
        disable the placement of toggled values when the switch couples the ground signal path to the detection path and a detection signal on the detection signal path has a first value; and enable the placement of toggled values when the switch couples the ground signal path to the detection path and the detection signal has a second value.

2. The apparatus of claim 1, wherein the control circuitry is further to control the switch to couple the ground signal path to the ground terminal based on the detection signal having the second value.

3. The apparatus of claim 1, wherein the detection signal has the first value when no device is connected to the USB Type-C connector port and has the second value when a device is connected to the USB Type-C connector port.

4. The apparatus of claim 3, further comprising a pull-up resistor coupled between the detection signal path and a supply voltage.

5. The apparatus of claim 3, wherein the control circuitry is further to:
detect when the device is no longer connected to the USB Type-C connector port; and
control the switch to couple the ground signal path to the detection signal path based on the detection.

6. The apparatus of claim 3, wherein the control circuitry is further to establish an orientation or a role associated with the connected device based on the toggled values on the CC signal path.

7. The apparatus of claim 1, wherein the power delivery circuitry is further to disable a power delivered to the CC logic when the switch couples the ground signal path to the detection path and the detection signal has the first value.

8. The apparatus of claim 1, further comprising one or more shield pins that are coupled to ground, wherein the shield pins are to provide return current carrying capability.

9. One or more non-transitory computer-readable media (NTCRM) having instructions, stored thereon, that when executed by one or more processors cause a device to:
disable placement of toggled values on a configuration channel (CC) signal path of a Universal Serial Bus (USB) Type-C connector port based on a detection signal having a first value;
enable placement of toggled values on the CC signal path based on the detection signal having a second value; and
control, based on the detection signal having the second value, a switch to transition from a first mode in which the switch couples a ground signal path of the USB Type-C connector port to a detection signal path on which the detection signal is provided to a second mode in which the switch couples the ground signal path to a ground terminal.

10. The one or more NTCRM of claim 9, wherein the detection signal has the first voltage when no device is connected to the USB Type-C connector port and has the second value when a device is connected to the USB Type-C connector port.

11. The one or more NTCRM of claim 10, wherein the instructions, when executed, are further to cause the device to:
detect when the device is no longer connected to the USB Type-C connector port; and
control the switch to transition to the first mode based on the detection.

12. The one or more NTCRM of claim 10, wherein the instructions, when executed, are further to cause the device to establish an orientation or a role associated with the connected device based on the toggled values on the CC signal path.

13. The one or more NTCRM of claim 9, wherein the instructions, when executed, are further to cause the device to disable a power delivered to CC logic based on the detection signal having the first value.

14. A computer system comprising:
a memory;
a processor coupled to the memory; and
a Universal Serial Bus (USB) Type-C circuitry coupled to the processor, wherein the USB Type-C circuitry includes:
an interface to a Configuration Channel (CC) signal path and to a ground signal path of a USB Type-C connector port;
a switch coupled to the ground signal path, the switch having a first mode in which the switch couples the ground signal path to a detection signal path and a second mode in which the switch couples the ground signal path to a ground terminal; and
power delivery circuitry coupled to the switch and the detection signal path, wherein the power delivery circuitry includes CC logic to place toggled values on the CC signal path, and wherein the power delivery circuitry is to:
disable the placement of toggled values based on a detection signal on the detection signal path having a first value; and
enable the placement of toggled values based on the detection signal having a second value; and
control the switch to transition from the first mode to the second mode based on the detection signal having the second value.

15. The computer system of claim 14, wherein the detection signal has the first value when no device is connected to the USB Type-C connector port and has the second value when a device is connected to the USB Type-C connector port.

16. The computer system of claim 15, wherein the USB Type-C circuitry further includes a pull-up resistor coupled between the detection signal path and a supply voltage to provide the detection signal with the first value when no device is connected to the USB Type-C connector port.

17. The computer system of claim 15, wherein the power delivery circuitry is further to:
detect when the device is no longer connected to the USB Type-C connector port; and
control the switch to transition to the first mode based on the detection.

18. The computer system of claim 14, wherein the power delivery circuitry is further to disable a power delivered to the CC logic when the switch is in the first mode and the detection signal has the first value.

19. The computer system of claim 14, further comprising a battery to be charged via the USB Type-C port.

20. The computer system of claim 14, wherein the processor is to communicate with another device via the USB Type-C port.

* * * * *